Figure 3:
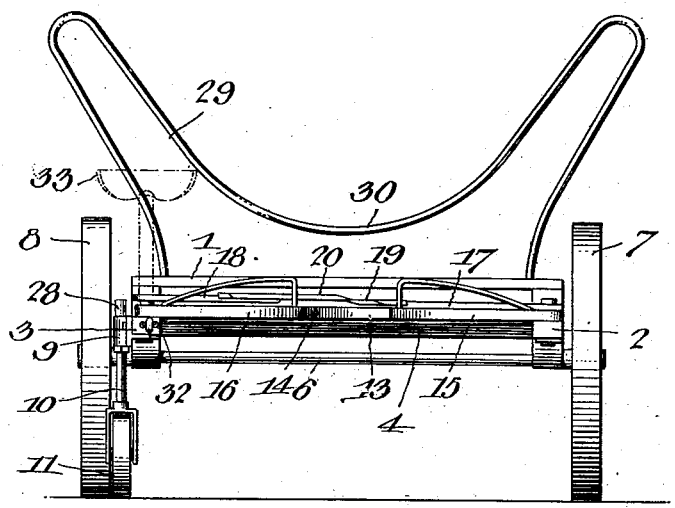

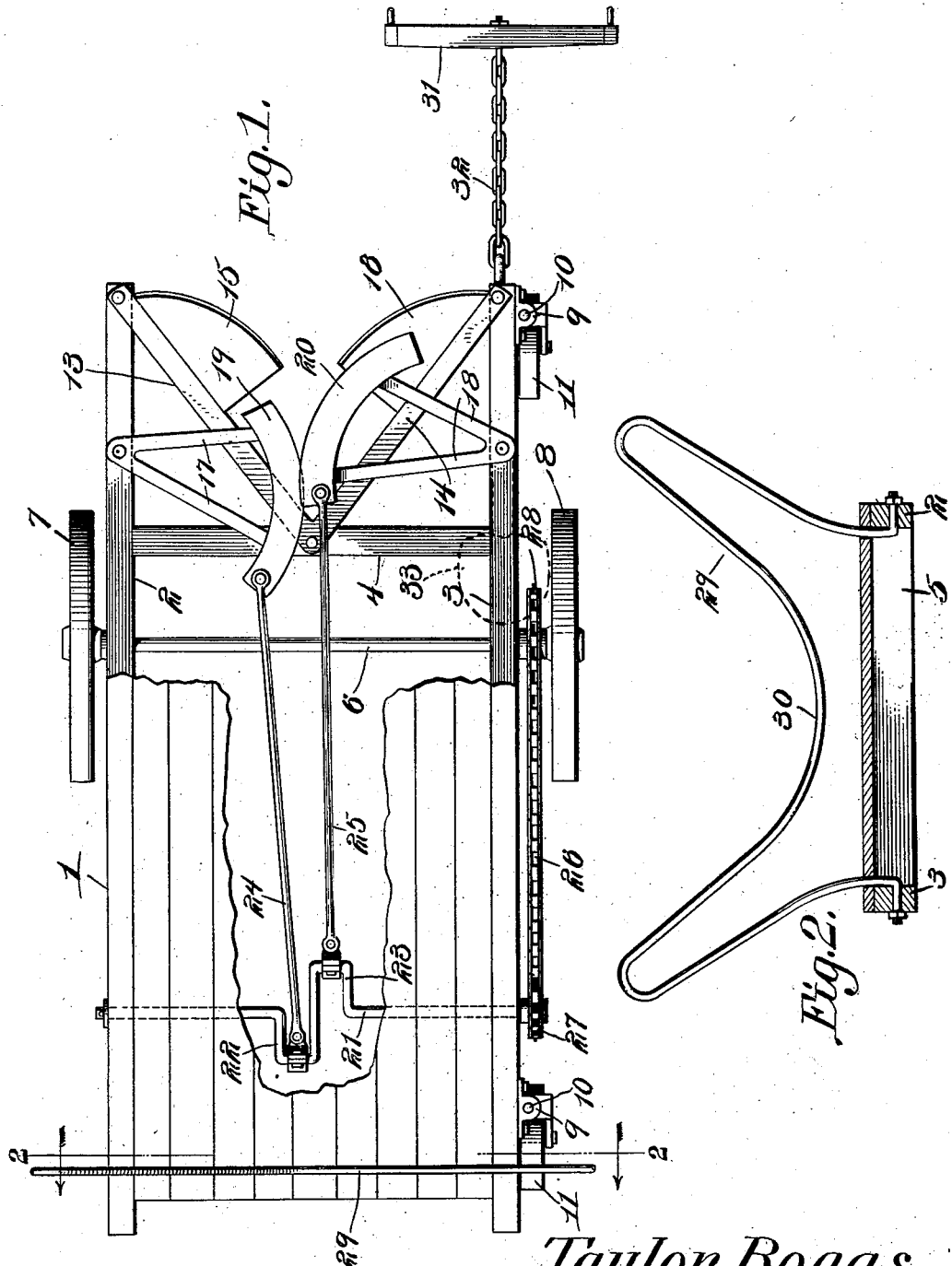

No. 755,210. PATENTED MAR. 22, 1904.
T. BOGGS.
CORN HARVESTER.
APPLICATION FILED NOV. 10, 1903.
NO MODEL. 2 SHEETS—SHEET 2.

Witnesses
Taylor Boggs,
Inventor.
by
Attorneys

No. 755,210.

Patented March 22, 1904.

UNITED STATES PATENT OFFICE.

TAYLOR BOGGS, OF CHILLICOTHE, OHIO.

CORN-HARVESTER.

SPECIFICATION forming part of Letters Patent No. 755,210, dated March 22, 1904.

Application filed November 10, 1903. Serial No. 180,500. (No model.)

*To all whom it may concern:*

Be it known that I, TAYLOR BOGGS, a citizen of the United States, residing at Chillicothe, in the county of Ross and State of Ohio, have invented a new and useful Corn-Harvester, of which the following is a specification.

This invention relates to that class of corn-harvesters in which a wheel-supported frame is provided with a cutting apparatus for the purpose of severing the cornstalks, which after being severed are deposited upon said frame or platform until a sufficient quantity has been accumulated to form a shock, when the corn is unloaded from the machine and shocked; and it has for its object to provide a machine of this class which shall possess superior advantages in point of simplicity, durability, and general efficiency.

With these ends in view my invention consists in the improved construction, arrangement, and combination of parts, which will be hereinafter fully described, and particularly pointed out in the claims.

In the accompanying drawings has been illustrated a form of embodiment of my invention which illustrates a simple and preferred construction, it being understood, however, that departures may be made from the construction shown as to the size, proportion, and exact manner of assemblage within the scope of my invention and without departing from the spirit or sacrificing the utility of the same.

In the accompanying drawings, Figure 1 is a plan view of a corn-harvesting machine constructed in accordance with the principles of my invention. Fig. 2 is a transverse sectional view taken on the line 2 2 in Fig. 1. Fig. 3 a front elevation.

Corresponding parts in the several figures are indicated by similar numerals of reference.

1 designates a rectangular frame which is composed of the left and right side beams 2 and 3 and the front and rear end beams 4 and 5. The side beams are extended in front of the frame-beam 4 and said side beams are mounted upon an axle 6, which is revoluble in its bearings and which carries a loose supporting-wheel 7 and a fixed drive-wheel 8.

The right-hand side beam is also provided near its front and rear ends with boxings 9, in which the shanks 10 of caster-wheels 11 are revolubly mounted. It will be seen that the right side of the machine is thus supported upon the driving-wheel 8 and the caster-wheels 11, thereby facilitating the turning of the machine at the ends of the rows.

The front ends of the side beams 2 and 3 are connected by braces 13 and 14 with the center of the front beam 4, and to the braces 13 and 14 are connected the guides 15 and 16, which converge rearwardly for the purpose of guiding the corn in the direction of the cutting apparatus. The latter comprises a pair of V-shaped frames 17 and 18, connected pivotally at their apices with the projecting ends of the side beams in such a manner as to be capable of swinging in horizontal planes. These planes, while described as V-shaped, are preferably provided with legs of unequal lengths, the rear leg of each frame being longer than the front leg.

Riveted or otherwise suitably secured to the outer end of the V-shaped frames 17 and 18 are curved knives or cutters 19 and 20, which may slightly overlap each other, so as to produce a shearing cut. The cutters 19 and 20, it will be observed, owing to the inequality in the length of the legs of the respective frames, will be disposed eccentrically with relation to the pivotal points of said frames. Consequently when either cutter swings or moves in a forward direction its rear end will be sure to be brought into the path of the cornstalks that are to be severed by the machine. This particular arrangement of the cutting mechanism I have found to be extremely useful and effective.

The side frame-pieces 2 and 3 support near their rear ends a transverse shaft 21, having oppositely-extending cranks 22 23, which are connected by pitmen 24 and 25 with the rear ends of the cutters 19 and 20. The connection of the pitmen with the cranks is to be made sufficiently loose to enable the front ends of the pitmen to swing slightly in a horizontal plane, as will be necessary when the machine is in operation, as will be readily understood. Motion is imparted to the crank-shaft 21 by means of a chain 26, connecting a sprocket-wheel 27 upon said shaft with the sprocket-wheel 28 upon the axle.

Suitably mounted upon the rear end of the frame is a rack 29, having an upper concave surface 30 for the reception of the cornstalks after the latter have been severed by the cutting apparatus. The draft attachment, illustrated in the drawings as a swingletree 31, is connected, preferably, with the front end of the side beam 3 by means of a chain 32. The side beam 3 also supports a seat 33 for the driver.

When in operation my improved machine is propelled over the field, the draft-animal will walk between the rows or adjacent to the row that is being operated upon. The stalks will be guided by the guides 15 and 16 to the cutters 19 and 20, which are reciprocated longitudinally independently of each other and at the same time swung upon their pivots, so that the cornstalks coming in contact therewith will be easily and effectively severed. It will be observed that while the tendency is for the cutter that is being moved in a rearward direction to carry the stalk with it in the direction of the opposite cutter there will be absolutely no tendency for the stalks to become jammed, inasmuch as the cutter that moves in a forward direction will exercise a shearing action. Thus while the cutters do not come together in a shear-like manner each has an independent shearing cut. As the stalks are severed the driver with one arm receives them and lays them back upon the support 30. When a sufficient quantity has been accumulated, the driver stops, unloads, and shocks the corn. My improved machine may progress in a straight forward direction, or it may cut around the shock, or it may be otherwise utilized in any manner that shall be best suited to the work in hand.

The construction of my improved corn-harvester, as will be seen from the foregoing description, is extremely simple, and it contains no part that is liable at any time to get out of order. The draft is light, and the device may be operated advantageously by a single man.

Having thus described my invention, I claim—

1. In a machine of the class described, pivotally-mounted frames, curved cutters supported by said frames, and means for swinging said frames in opposite directions with relation to each other.

2. In a machine of the class described, a wheel-supported frame having forwardly-extended side pieces, frames pivotally mounted upon the extended ends of said side pieces, curved cutters supported by said frames, a double crank-shaft, pitmen connecting the cranks of said shaft with the cutters, and means for transmitting motion to said crank-shaft from the axle of the machine.

3. In a corn-harvesting device, a wheel-supported frame having cross-pieces and side pieces, the latter extended in front of the front cross-piece, braces connecting the ends of said side pieces with the center of the front cross-piece, guides supported by said braces, and cutting apparatus, including pivotally-mounted frames, curved coöperating cutters supported upon said frames and means for swinging the latter oppositely to each other in horizontal lines.

4. In a corn-harvesting machine, a rectangular frame, a revoluble axle supporting said frame, a loose supporting-wheel at one end and a fixed driving-wheel at the other end of said axle, caster-wheels supporting the front and rear ends of the side of the frame adjacent to the driving-wheel, frames mounted pivotally upon the sides of the frame at the front end of the same and carrying curved coöperating cutters, a transversely-disposed double crank-shaft, pitmen boxed upon the cranks of said shaft and having pivotal connection with the rear ends of the cutters, and means for transmitting motion to the crank-shaft from the driving-wheel of the machine.

5. In a corn-harvesting machine, a cutting apparatus comprising a pair of frames mounted pivotally to swing in horizontal planes and having divergent arms and coacting curved cutters secured upon and connecting the divergent arms of said frames.

6. In a corn-harvesting machine, a cutting apparatus comprising two pivotally-mounted frames having divergent arms, coacting curved cutters mounted upon the divergent arms of said frames, and reciprocatory operating means connected with the cutters.

7. In a corn-harvesting machine, a pair of curved coöperating cutters, frames having apices and divergent arms supporting said cutters upon their divergent arms, pivotal supporting means for the apices of said frames, and means for swinging the latter upon their respective pivots in horizontal planes.

8. In a corn-harvesting machine, a pair of curved coacting cutters, pivoted supporting means for the same, and means for longitudinally reciprocating said cutters and for incidentally swinging them in horizontal planes upon the pivots of the supporting means.

9. In a corn-harvesting machine, a wheel-supported frame, cutting means including a pair of curved coacting cutters, pivoted supporting means for the same, and means for imparting to said cutters a swinging and longitudinally-reciprocatory movement, means for guiding stalks into engagement with said cutters, a stalk-supporting device at the rear end of the frame, a driver's seat supported upon one side of the frame, and a draft attachment connected with the side of the frame supporting said seat.

10. In a corn-harvesting machine, a cutting apparatus comprising a pair of frames having front and rear legs, pivotally mounted to swing in horizontal planes, the front and rear legs of said frames being of unequal length, and curved coacting cutters supported upon the outer ends of said frames.

In testimony that I claim the foregoing as my own I have hereto affixed my signature in the presence of two witnesses.

TAYLOR BOGGS.

Witnesses:
SAMUEL M. VEAIL,
F. A. STACEY.